(12) United States Patent
Stegall

(10) Patent No.: US 9,604,243 B1
(45) Date of Patent: Mar. 28, 2017

(54) ADHESIVE DISPENSER

(71) Applicant: GLS Products, LLC, Charlotte, NC (US)

(72) Inventor: Gordon Lee Stegall, Charlotte, NC (US)

(73) Assignee: GLS Products, LLC, Charlotte, NC (US)

( * ) Notice: Subject to any disclaimer, the term of this patent is extended or adjusted under 35 U.S.C. 154(b) by 85 days.

(21) Appl. No.: 14/848,487

(22) Filed: Sep. 9, 2015

(51) Int. Cl.
*B05C 5/00* (2006.01)

(52) U.S. Cl.
CPC .................... *B05C 5/001* (2013.01)

(58) Field of Classification Search
CPC B05C 5/00; B05C 5/01; B05C 11/042; B29B 13/022; B29K 2105/0097; A47J 27/004; H05B 3/00; B29C 45/2737; B41B 11/76; B41B 11/78
USPC ... 222/146.2, 146.5; 219/386, 420, 421, 424
See application file for complete search history.

(56) References Cited

U.S. PATENT DOCUMENTS

| | | | | |
|---|---|---|---|---|
| 1,279,682 A | * | 9/1918 | Fort | B41B 11/82 |
| | | | | 219/421 |
| 1,321,071 A | * | 11/1919 | Hadaway | H05B 3/00 |
| | | | | 164/304 |
| 1,493,373 A | * | 5/1924 | Morgan | H05B 3/00 |
| | | | | 219/421 |
| 1,689,196 A | | 10/1928 | Dunn | |
| 1,785,607 A | * | 12/1930 | Willis | B41B 11/76 |
| | | | | 219/421 |
| 2,118,953 A | | 5/1938 | Thielker | |
| 3,011,042 A | | 11/1961 | Kamborian | |
| 3,858,985 A | | 1/1975 | Fiveash | |
| 3,952,921 A | | 4/1976 | Tanner | |
| 4,598,842 A | | 7/1986 | Sticher et al. | |
| 5,650,083 A | | 7/1997 | Bondeson et al. | |
| 5,662,243 A | | 9/1997 | Bondeson et al. | |
| 6,019,255 A | | 2/2000 | Tanury | |
| 6,318,247 B1 | * | 11/2001 | Di Nunzio | A47J 27/004 |
| | | | | 366/146 |
| 7,326,884 B1 | * | 2/2008 | Anderson | A47J 9/001 |
| | | | | 219/386 |

* cited by examiner

*Primary Examiner* — J. Casimer Jacyna
(74) *Attorney, Agent, or Firm* — Hammer & Associates, P.C.

(57) ABSTRACT

An adhesive dispenser includes: a vessel has an open top and a closed bottom, and defines an interior cavity; a handle is affixed on one side of the vessel; a lid with an adhesive charge port closes the open top; a pour spout opens through the lid and is positioned on a side of the cavity opposite the handle, the pour spout includes a channel formed in the cavity and the channel extends from the pour spout to adjacent the bottom of the cavity; and a heater including a heating element for melting adhesive placed in the cavity, and a fin extending axially from the bottom of the cavity. The method for dispensing includes pouring a liquid adhesive from the dispenser.

20 Claims, 5 Drawing Sheets

ADHESIVE DISPENSER

FIELD OF THE INVENTION

The instant invention is directed to an adhesive dispenser and a method of using the adhesive dispenser.

BACKGROUND OF THE INVENTION

Adhesives are used in many applications. For example, hot melt adhesives may be used in the fabrication of molds. The molten adhesive may be used to adhere mold pieces to a mold surface. The adhesive is dispensed onto the surface of the mold or to the mold piece, and then the piece is affixed to the mold surface. To facilitate the fabrication of larger molds, it may be necessary for many mold pieces to be adhered to the mold surfaces. This may require large amounts of the adhesive.

The adhesive dispensers used to date are bulky, difficult to handle (e.g., pour), and can be hot (due to the molten adhesive). There is a need for a better adhesive dispenser.

SUMMARY OF THE INVENTION

An adhesive dispenser includes: a vessel has an open top and a closed bottom, and defines an interior cavity; a handle is affixed on one side of the vessel; a lid with an adhesive charge port closes the open top; a pour spout opens through the lid and is positioned on a side of the cavity opposite the handle, the pour spout includes a channel formed in the cavity and the channel extends from the pour spout to adjacent the bottom of the cavity; and a heater including a heating element for melting adhesive placed in the cavity, and a fin extending axially from the bottom of the cavity. The method for dispensing includes pouring a liquid adhesive from the dispenser.

DESCRIPTION OF THE DRAWINGS

For the purpose of illustrating the invention, there is shown in the drawings a form that is presently preferred; it being understood, however, that this invention is not limited to the precise arrangements and instrumentalities shown.

DESCRIPTION OF THE INVENTION

Figure 1:
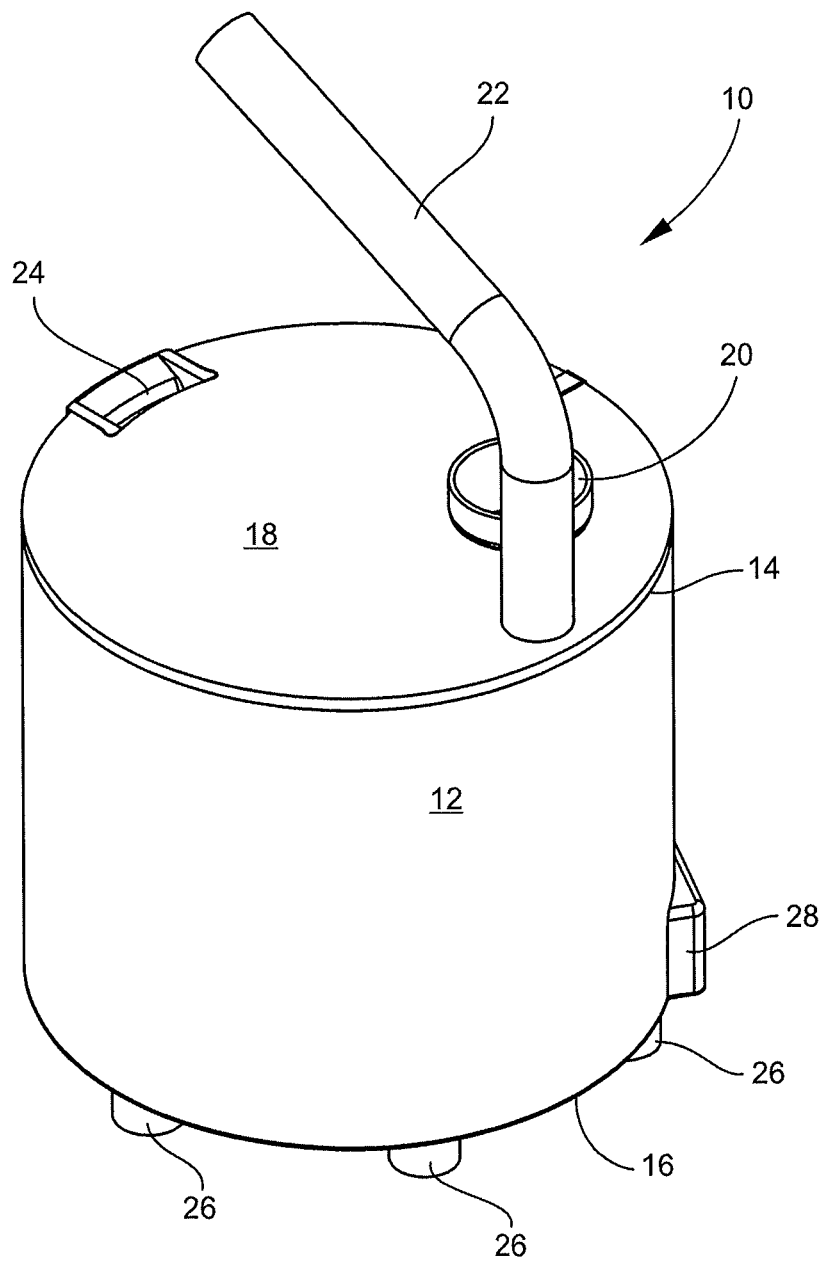
FIG. 1 is an isometric view of an embodiment of the invention.

Referring to the drawings, where like numerals indicate like elements, there is shown, in FIG. 1, an adhesive dispenser 10 made according to the instant invention. Dispenser 10 may be used with any adhesive. The adhesive must be in a liquid (or flowable) form for dispensing (or pouring) from the dispenser. In one embodiment, the adhesive is a hot-melt adhesive (HMA) or hot glue. Hot-melt adhesive, as used herein, refers a thermoplastic adhesive that is sold as a solid, but is melted for use. Hot-melt adhesive may refer to any hot-melt adhesive.

Figure 3:
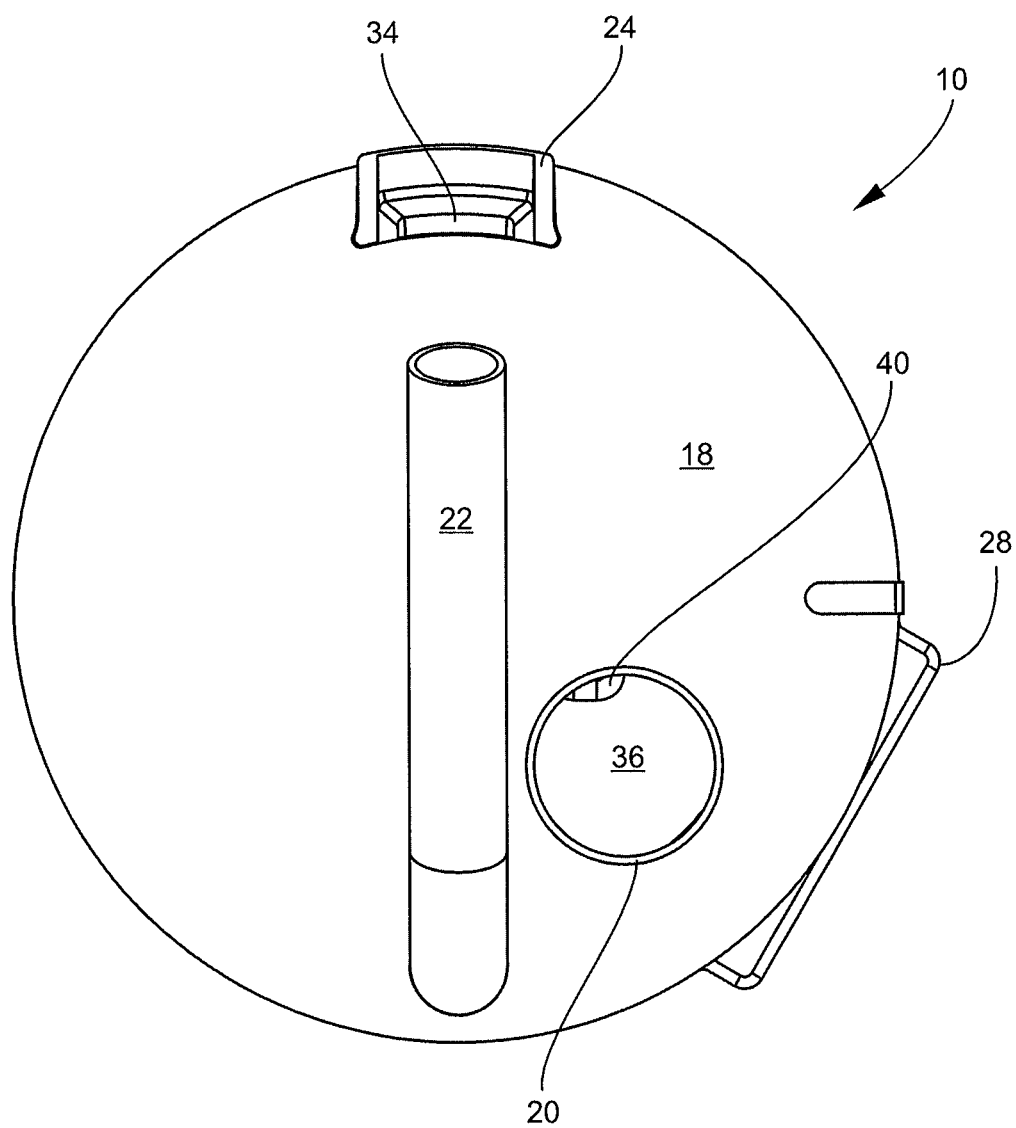
FIG. 3 is a top plan view of the embodiment shown in FIG. 1.
Figure 4:
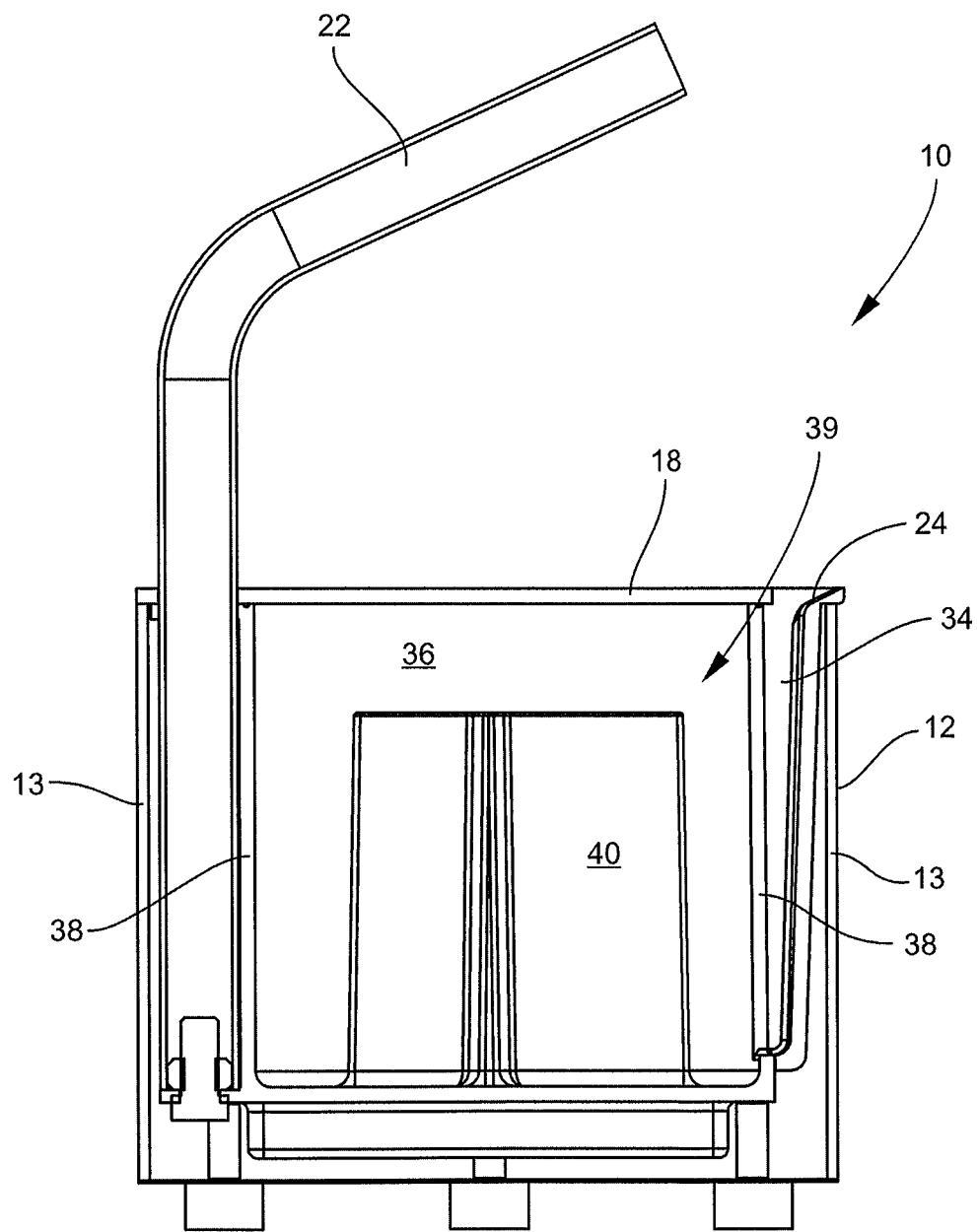
FIG. 4 is a sectional view (side elevation) of the embodiment shown in FIG. 1.
Figure 5:
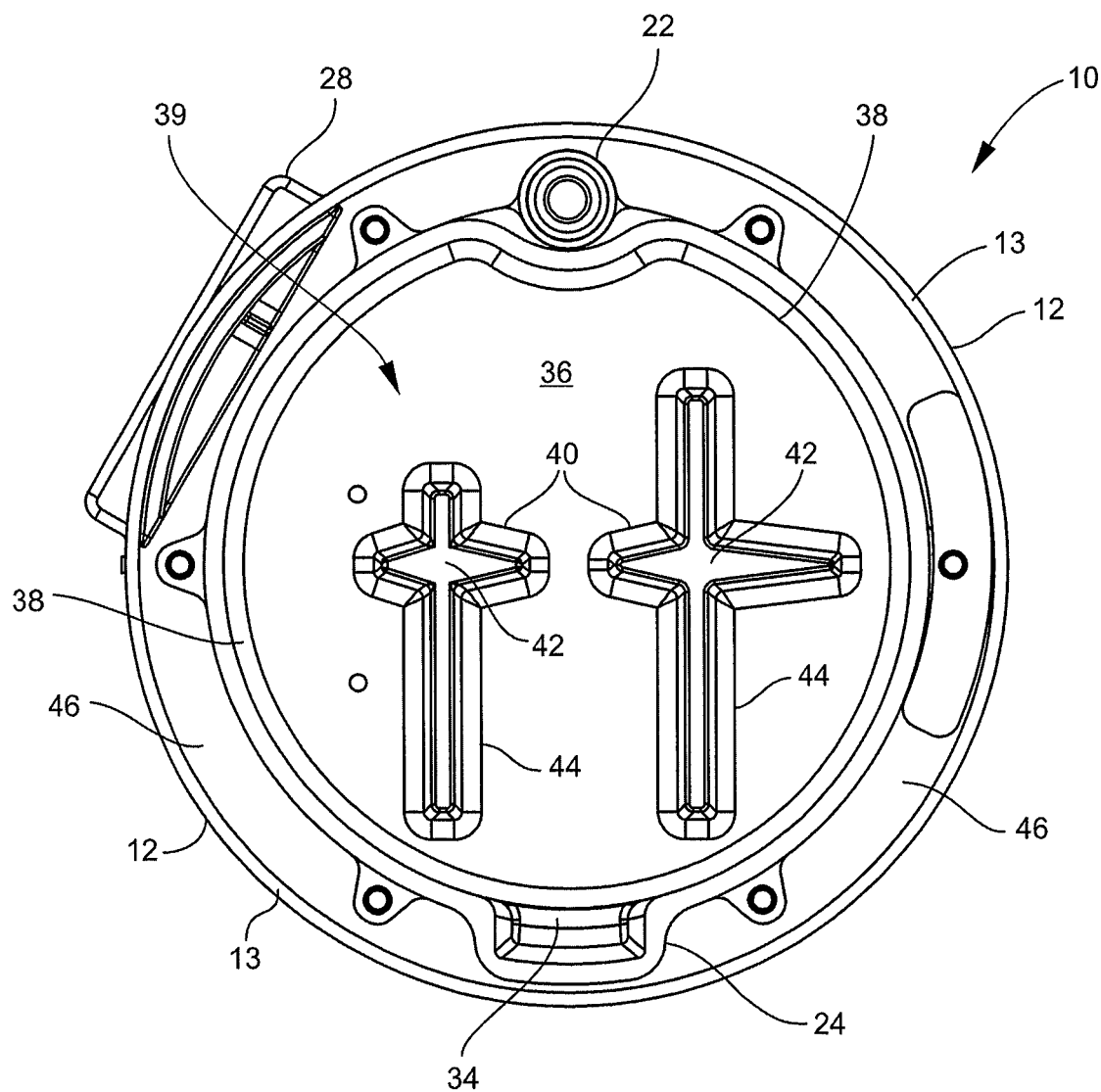
FIG. 5 is a top plan view of the embodiment shown in FIG. 1 with the lid removed.

Referring to FIG. 1, dispenser 10 generally includes: a vessel 12 with an open top 14 and a closed bottom 16 that defines an interior cavity 36 (cavity—best seen in FIGS. 4 and 5); a handle 22 affixed to one side of the vessel 12; a lid 18 with an adhesive charge port 20, the lid closes the open top 14 of the vessel 12; a pour spout 24 located on the side opposite of the vessel 12 from the handle 22, the spout 24 includes a channel 34 (channel—best seen in FIGS. 3-5); and a heater 39 including a heating element (not shown) and a fin 40.

Vessel 12 may have any cross-section shape. In the embodiment shown, the vessel is cylindrical. The vessel 12 has an open top 14 and closed bottom 16. The vessel may include a plurality of legs 26 located at the bottom of the vessel 12. The vessel 12 may have a double walled configuration with an exterior wall 13 and internal wall 38. The internal wall (or cavity wall) 38, see FIGS. 4 and 5, defines the interior cavity 36. The space 46 between walls 13 and 38 may be filled with insulation.

Handle 22 is affixed to one side of the vessel 12. Handle 22 may be tubular. Handle 22 may extend from the bottom of vessel 12, see FIG. 4. Handle 12 may extend above the top of vessel 12. Handle 12 may be curved over the top of vessel 12 to facilitate handling and pouring. Handle 22 may be insulated so that is does not transfer heat from the cavity 36. Handle 22 may include a grip (not shown). The grip may be for protection against heat transfer and to facilitate hold and/or pouring.

Lid 18 closes the open top 14 of the vessel 12. Lid 18 may be removable. Lid 18 may be securely fastened to the vessel 12 when the vessel is in use (to prevent the inadvertent spilling of the molten content of the cavity). Lid 18 may include a charge port 20. Charge port 20 provides ingress to cavity 36, so that solid adhesive may be charged into the vessel for liquification. Charge port 20 may include a cap (not shown).

Pour spout 24 is an opening through the lid 18 and is in fluid communication with the cavity 36. Pour spout 24 enables the liquid adhesive to be poured (or discharged) from the cavity 36. Pour spout 24 is located on a side of the vessel 12 opposite the handle 22. Pour spout 24 may have any shape. In one embodiment, the pour spout is generally rectangular.

Channel 34 is included with pour spout 24. Channel 34 is positioned on the side opposite handle 22. Channel 34, best seen in FIGS. 4 and 5, may have any cross-sectional configuration. In one embodiment, channel 34 may have a generally rectangular cross-section. Channel 34 is formed in the vessel 12, specifically, channel 34 is formed in the cavity wall 38. Channel 34 has a larger cross-sectional area adjacent the top 14 of the vessel 12 than adjacent the bottom 16 of the vessel 12. Channel 34 is tapered from the top 14 of the vessel to the bottom 16 of the vessel. Channel 34 may extend from the bottom 16 of the vessel to the pour spout 24.

Heater 39 may form a part of the dispenser 10. Heater 39 generally includes a heating element (not shown) for melting adhesive placed in cavity 36, and a fin 40 extending axially from the bottom 16 of the cavity. The heater 39 is configured to minimize the heat gradient from the top of the cavity to the bottom of the cavity (i.e., the temperature of the molten adhesive within the cavity is generally uniform throughout—it does not have a significant heat gradient from the top to bottom of the cavity). The heating elements may be any conventional heating elements. The heating elements may be placed adjacent to or within the cavity wall 38. The heating elements, in one embodiment, may be electric.

Fin 40 extends axially up from the bottom of the cavity 36. There may be one of more fins 40 within cavity 36. Fins 40 may be placed within the cavity 36, so as not to interfere with the charging of adhesive through charge port 20 (see FIG. 3). Fins 40 may be offset from charge port 20. Fin 40 may have any cross-sectional configuration. In one embodiment, see FIG. 5, fins 40 may have a cross-section with two or more radially extending blades. In another embodiment, see FIG. 5, fins 40 may have a cross-shaped cross-section. Fins 40 may be tapered, i.e., narrower at the top of the fin than at the base of the fin.

Figure 2:
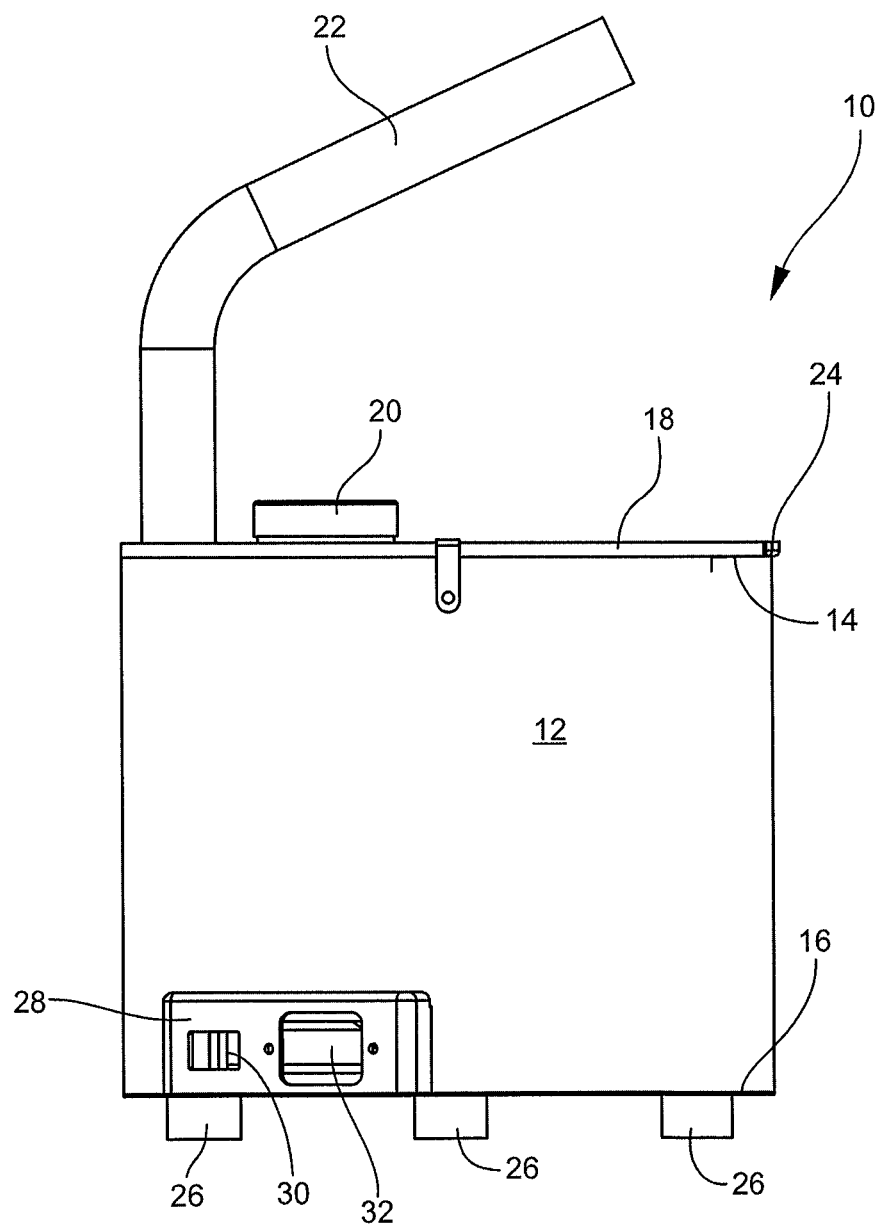
FIG. 2 is a side elevational view of the embodiment shown in FIG. 1.

Controller 28 is located on the exterior surface of the dispenser 10, see FIGS. 1 and 2. Controller 28 is operatively connected with the heater 39. Controller 39 may include a socket 30 and a temperature control 32. Socket 30 may be a male electrical connector, so that an electrical cord may connect the dispenser with a source of electricity. Temperature control 32 may be used to adjust the temperature with the cavity 36 as required by adhesive or for proper flowability.

In use, solid adhesive is charged into cavity 36 via port 20. An electrical cord is used to couple the dispenser 10 to the source of electricity and the temperature control 32 is adjusted. The solid adhesive is given sufficient time to melt (i.e., become flowable). Then, the dispenser 10 may be disengaged from the electrical cord. In one embodiment, the electrical cord is disengaged from the dispenser 10. The dispenser 10 is manipulated via handle 22, and may be poured, as and where desired, by tilting of the handle so that the liquid adhesive is discharged via spout 24. The liquid adhesive flows from the cavity 36 into channel 34 and out via spout 24.

The present invention may be embodied in other forms without departing from the spirit and the essential attributes thereof, and, accordingly, reference should be made to the appended claims, rather than to the foregoing specification, as indicating the scope of the invention.

I claim:

1. A method of dispensing an adhesive comprises the steps of:
   pouring a liquid adhesive from a dispenser, the dispenser including: a vessel has an open top and a closed bottom, and defines an interior cavity; a handle is affixed on one side of the vessel; a lid with an adhesive charge port closes the open top; a pour spout opens through the lid and is positioned on a side of the cavity opposite the handle, the pour spout includes a channel formed in the cavity and the channel extends from the pour shout to adjacent the bottom of the cavity; and a heater including a heating element for melting adhesive placed in the cavity, and a fin extending axially from the bottom of the cavity.

2. The method of claim 1 wherein the channel has a generally rectangular cross-section.

3. The method of claim 1 wherein the channel is tapered from the top of the vessel to the bottom of the vessel.

4. The method of claim 1 wherein the channel has a larger cross-section at the top of the vessel than at the bottom of the vessel.

5. The method of claim 1 wherein the handle extends above the top of the vessel.

6. The method of claim 1 wherein the handle is curved over the top of the vessel.

7. The method of claim 1 wherein the fin minimizes a heat gradient from the top of the vessel to the bottom of the vessel.

8. The method of claim 1 wherein the fin has two or more radially extending blades.

9. The method of claim 1 wherein the fin a cross-shaped cross-section.

10. The method of claim 1 wherein the fin tapers from the bottom of the vessel to the top of the vessel.

11. An adhesive dispenser comprises:
    a vessel has an open top and a closed bottom, and defines an interior cavity;
    a handle is affixed on one side of the vessel;
    a lid with an adhesive charge port closes the open top;
    a pour spout opens through the lid and is positioned on a side of the cavity opposite the handle, the pour spout includes a channel formed in the cavity and the channel extends from the pour spout to adjacent the bottom of the cavity; and
    a heater including
       a heating element for melting adhesive placed in the cavity, and
       a fin extending axially from the bottom of the cavity.

12. The dispenser of claim 11 wherein the channel has a generally rectangular cross-section.

13. The dispenser of claim 11 wherein the channel is tapered from the top of the vessel to the bottom of the vessel.

14. The dispenser of claim 11 wherein the channel has a larger cross-section at the top of the vessel than at the bottom of the vessel.

15. The dispenser of claim 11 wherein the handle extends above the top of the vessel.

16. The dispenser of claim 11 wherein the handle is curved over the top of the vessel.

17. The dispenser of claim 11 wherein the fin minimizes a heat gradient from the top of the vessel to the bottom of the vessel.

18. The dispenser of claim 11 wherein the fin has two or more radially extending blades.

19. The dispenser of claim 11 wherein the fin has a cross-shaped cross-section.

20. The dispenser of claim 11 wherein the fin tapers from the bottom of the vessel to the top of the vessel.

* * * * *